United States Patent

[11] 3,618,577

[72] Inventors Norman T. Shaw
 La Mesa, Calif.;
 William A. Engstrom, North Muskegon, Mich.
[21] Appl. No. 720,589
[22] Filed Apr. 11, 1968
[45] Patented Nov. 9, 1971
[73] Assignee Continental Motors Corporation
 Muskegon, Mich.

[54] SEPARATOR FOR FUEL-AIR INDUCTION SYSTEM
 2 Claims, 2 Drawing Figs.
[52] U.S. Cl. .................................................. 123/122 AC,
 55/441, 55/461, 55/466, 55/468, 123/122 F
[51] Int. Cl. ....................................................... F02m 31/00,
 F02m 33/00
[50] Field of Search ............................................ 123/122 A

[56] References Cited
 UNITED STATES PATENTS
1,676,955 7/1928 Kemp ............................ 123/122 A
1,697,795 1/1929 Summers ....................... 123/122 A
1,730,641 10/1929 Brush ............................ 123/122 A
1,797,978 3/1931 Garrett .......................... 123/122 A
1,801,096 4/1931 Liebherr ........................ 123/122 A
3,116,988 1/1964 Lauder .......................... 123/122 A
795,412 7/1905 Olson ............................ 55/434
2,126,596 8/1938 Wood ............................ 55/343
2,308,365 11/1940 Hornsbrook .................. 55/341

Primary Examiner—Mark M. Newman
Attorney—Hauke, Gifford and Patalidis

ABSTRACT: A separator for a specialized fuel-air induction system in which a fuel-air mixture formed in a standard carburetor is introduced into the separator to remove substantially all the air from the fuel, the separated fuel then being directed to a retort heat exchanger arranged within the exhaust manifold of the internal combustion engine to dry-vaporize the fuel, which is then remixed with the air conducted from the separator and introduced into the cylinder intake ports of the engine, the improved separator comprising a housing having a vertical cylindrical chamber provided with an air outlet at its upper end and a fuel outlet at its lower end, with a fuel-air mixture inlet conduit extending inwardly through the sidewall of the housing and terminating in a downwardly directed inlet opening disposed in a lower portion of the chamber hemispherically formed for improved separation of the fuel and air, and the inlet conduit being adapted for connection to a carburetor disposed laterally of the separator housing.

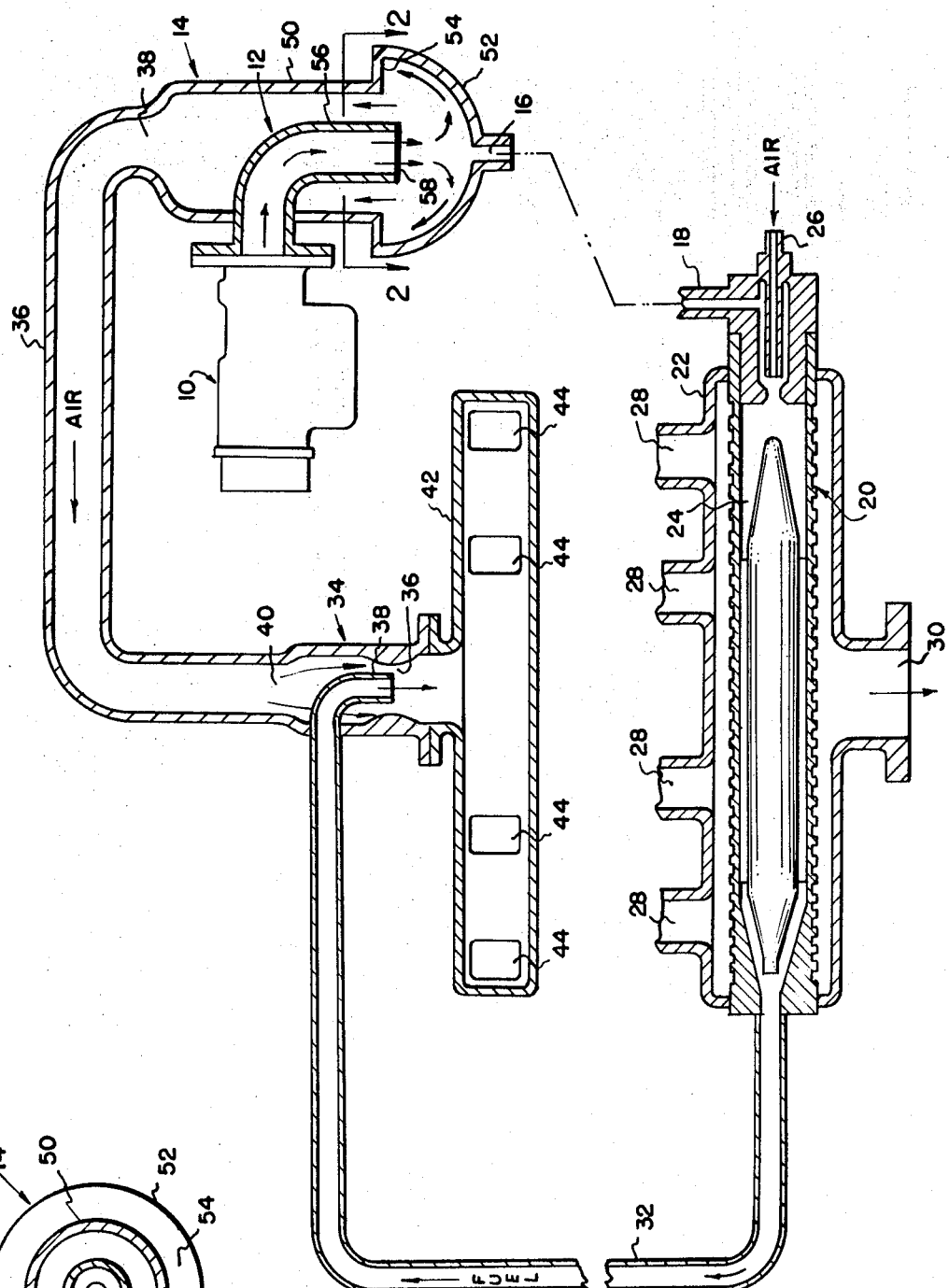
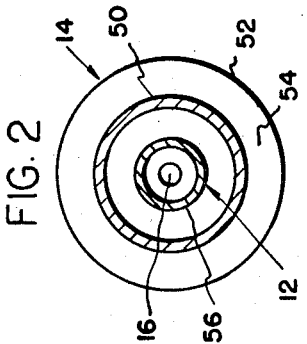

SEPARATOR FOR FUEL-AIR INDUCTION SYSTEM

BACKGROUND OF THE INVENTION

1. Field Of The Invention

The present invention relates to fuel-air induction systems in which a standard type of carburetor is used to form the proper fuel-air mixture charge for combustion in the engine cylinders, the fuel component of the mixture being substantially separated from the air component after carburetion and then converted to a dry vapor phase by passing it through a retort heat exchanger which extends through the engine exhaust manifold intermediate the cylinder exhaust ports and the exhaust outlet, the dry fuel vapor then being remixed with the air which travels a separate path from the separator, and the final fuel-air mixture then being introduced into the engine cylinder intake ports.

2. Description Of The Prior Art

The present invention is an improvement on U.S. Pat. No. 3,116,988 issued Jan. 7, 1964 to Alfred E. Lauder. This system is intended to eliminate the introduction of wet fuel to the engine resulting in incomplete combustion and a production of harmful smog byproducts. The separation of the premixed fuel and air is accomplished in a centrifugal type separator, the fuel is completely vaporized in a heat exchanger using the engine exhaust heat for this purpose, and the fuel and air, which travel separate paths from the separator, are then recombined in a mixing chamber having a venturi system for producing low pressures in the fuel lines to ensure that all of the fuel is drawn through the heat exchanger from the separator and into the air prior to introduction into the engine cylinder intake ports. The Lauder patent has utility only in connection with downdraft carburetors.

SUMMARY OF THE INVENTION

The present invention consists of an improvement in the construction of the separator, making it adaptable for connection with side-draft and up-draft carburetors, and resulting in improved separation of the air and fuel, which fuel-air charge has previously been formed in the carburetor in accordance with the demands of the engine. The improved construction uses a housing having a vertically disposed, substantially cylindrical upper chamber portion and a lower hemispherical portion of a diameter larger than the cylindrical portion and an annular flange connecting the two portions to provide a baffle for the entrapment of the separated liquid fuel, the inlet from the carburetor comprising a conduit which extends through the sidewall of the housing and curved downwardly to terminate in an opening which is within the hemispherical chamber portion, such that separation is first initiated in the curved portion of the inlet conduit. Then as the mixture tends to circulate outwardly in the hemispherical chamber portion, it is thrown centrifugally outwardly against the walls thereof and is entrapped by the flange so that it will then flow downwardly to the fuel outlet. The separated air, which may contain a very minor portion of the fuel in vaporized form, travels upwardly and out the top of the housing for subsequent remixture with the fuel after same is completely dry-vaporized in the retort heat exchanger.

DESCRIPTION OF THE DRAWING

A more complete understanding of the present invention will be provided by reference to the accompanying drawing illustrating a preferred embodiment of the invention in which like reference characters refer to like parts throughout the several views and in which:

FIG. 1 is a diagrammatic view of the fuel-air induction system and the separator embodied therein and illustrating the improved construction thereof; and FIG. 2 is a cross-sectional view of the separator taken substantially on the line 2—2 of FIG. 1.

DESCRIPTION OF THE PREFERRED EMBODIMENT

The present system employs a standard carburetor 10 which, in conventional practice, produces a fuel-air mixture in accordance with engine demands, which mixture is introduced through a pipe or conduit 12 into a separator assembly 14, constructed to separate substantially all of the atomized fuel from the air. The fuel is conducted from a fuel outlet 16 located at the lower end of the separator assembly 14 through a conduit 18 or the like to heat exchanger assembly 20 constructed within an exhaust manifold 22. The fuel passes into an annular chamber 24, aspirating a small quantity of air through a tube 26 as shown for the purpose of spraying the fuel onto the chamber 24 sidewalls through which heat inside the exhaust manifold is conducted. As shown, the exhaust from the engine passes from the engine cylinder exhaust ports 28 around the heat exchanger 20 and exits through the exhaust outlet 30. The fuel in the heat exchanger is completely dry-vaporized and discharged through a conduit 32 or the like to a mixing assembly 34, to which the separated air from the separator 14 is conducted by means of a conduit 36 or the like from an air outlet 38 disposed at the upper end of the separator assembly 14.

The mixing assembly 34 comprises a housing having a venturi chamber 36 arranged with a fuel vapor outlet 38 in the center and an air outlet 40 directing the air through the venturi chamber, the remixed fuel vapor and air then passing into the intake manifold 42 of the engine and to the engine cylinders via the cylinder intake ports 44. Intake manifold suction imposed on the venturi of the mixing chamber 36 produces a higher suction at the fuel vapor outlet 38, thus assuring that all of the fuel vapor will be drawn through the fuel portion of the system.

The fuel-air mixture separator 14 comprises a two-part housing having an upper cylindrical chamber portion 50 and a lower hemispherical chamber portion 52 of larger diameter than the cylindrical portion 50 and arranged as shown with an annular flange 54 extending from the peripheral edge of the hemispherical portion 52 to the peripheral lower edge of the cylindrical portion 50, thereby providing a baffle for a purpose to be described.

The fuel-air mixture conduit 12 extends inwardly through the sidewall of the upper housing chamber portion 50 and is curved downwardly, terminating in a straight portion 56 with its outlet opening 58 disposed below the flange 54 and within the hemispherical portion 52. The fuel outlet 16 is located axially at the lower point of the hemispherical portion 52, and the air outlet 38 is disposed axially at the upper point of the cylindrical portion 50 as shown.

In operation, the fuel-air mixture from the carburetor in passing through the conduit 12 will, due to centrifugal action imposed in the curving portion, begin to separate the atomized fuel component from the air component. Then, the mixture flowing from the outlet 58 will turn arcuately upward, causing most of the remaining fuel droplets to separate out and be thrown against the walls of the hemispherical housing portion 52. The air will continue upwardly through the arcuate space between the conduit 12 and the inner walls of the cylindrical chamber portion 50, and exit through the air outlet 38. The liquid fuel becomes entrapped in the hemispherical chamber portion 52 by the annular flange 54, and will flow downward to the fuel outlet 16. A small amount of air may also pass out the fuel outlet 16, and a small amount of fuel may, in the form of vapor, be entrained in the air passing upwardly out the air outlet 38, but the present construction ensures that the major portion of the air is removed from the major portion of the fuel. In any event, by the time the fuel and air meet again in the mixing assembly 34, the fuel will be substantially completely vaporized and dry, for the complete remixing with the air component and the introduction of a completely satisfactory combustible mixture into the cylinders of the engine, where it will be practically completely burned, producing only an extremely small quantity of unburned combustion products in the engine exhaust.

It will be apparent that the present construction of the separator is readily adaptable to side-draft and up-draft carburetors and will produce the high degree of separation required for this type of fuel-air induction system.

For convenience, the full internal combustion engine and its carburetor are not shown, as the details are well known to those skilled in the art.

I claim:

1. In the fuel-air induction system for an internal combustion engine in which a metered fuel-air mixture from a standard carburetor is introduced into a separator operable to centrifugally separate a major portion of the liquid fuel from the air, the liquid fuel being spray-atomized into a retort heat exchanger disposed within an exhaust manifold in heat exchange relation with exhaust gases conducted from the engine cylinder exhaust ports to an exhaust outlet, thereby dry-vaporizing said atomized fuel, the dry fuel vapor from the heat exchanger and the separated air from the separator being subsequently remixed in a venturi mixing chamber and then conducted to the engine cylinder intake ports, the improvement in said separator comprising:

- a housing having a vertically disposed separating chamber, said separating chamber having a cylindrical upper portion and an enlarged hemispherical lower portion with its arcuate surface on the bottom, and an annular flange on the upper edge of said hemispherical portion inwardly extending and adjoined to the lower end of the cylindrical upper portion to provide a baffle for the entrapment of separated fuel which after separating flows downwardly in the hemispherical lower portion;
- an air outlet axially disposed at the upper end of said separating chamber and adapted for connection with said mixing chamber;
- a fuel outlet axially disposed at the lower end of said hemispherical lower portion and adapted for connection with said heat exchanger; and
- a fuel-air mixture inlet disposed in the side of said cylindrical upper portion intermediate said air and fuel outlets and adapted for connection with a carburetor outlet laterally of said housing, said fuel-air mixture inlet comprising a conduit extending laterally through the sidewall of said cylindrical upper portion and terminating within said separating chamber at a downwardly directed inlet opening, said conduit inlet opening being disposed substantially below a lateral plane containing said flange.

2. The improvement as defined in claim 1, and in which said conduit curves downwardly from the sidewall to coincide with the vertical axis of the separating chamber and is smaller than same to provide an arcuate space between the conduit and the inner surface of the housing for upward passage of air therethrough.

* * * * *